United States Patent [19]
Woody

[11] Patent Number: 5,711,558
[45] Date of Patent: Jan. 27, 1998

[54] CHARGER LOCKING MECHANISM

[75] Inventor: George R. Woody, Redondo Beach, Calif.

[73] Assignee: Delco Electronics Corporation, Kokomo, Ind.

[21] Appl. No.: 703,277

[22] Filed: Aug. 26, 1996

[51] Int. Cl.$^6$ ................................................. E05B 63/20
[52] U.S. Cl. .................. 292/335; 292/167; 292/171; 292/144; 320/2; 336/DIG. 2; 439/347; 439/950
[58] Field of Search .................................. 292/166, 167, 292/168, 171, 174, 144, 335; 336/DIG. 2; 320/2; 439/347, 345, 372, 950

[56] References Cited

U.S. PATENT DOCUMENTS

| | | | |
|---|---|---|---|
| 816,792 | 4/1906 | Green et al. | 292/144 |
| 1,568,353 | 1/1926 | Tullis | 292/335 |
| 1,662,450 | 3/1928 | Anderson | 292/335 |
| 2,240,400 | 4/1941 | Johnson | 292/335 |
| 2,529,361 | 11/1950 | Abbas | 292/166 |
| 2,570,390 | 10/1951 | Schuldt | 292/335 |
| 3,157,042 | 11/1964 | Wolz | 292/167 X |
| 3,601,453 | 8/1971 | Silverman | 292/144 |
| 4,080,757 | 3/1978 | Westerman | 292/166 X |
| 5,386,713 | 2/1995 | Wilson | 292/144 X |
| 5,506,489 | 4/1996 | Abbott et al. | 320/2 X |

FOREIGN PATENT DOCUMENTS

| | | | |
|---|---|---|---|
| 649708 | 9/1928 | France | 292/144 |
| 53-67935 | 6/1978 | Japan | 292/144 |

*Primary Examiner*—Rodney M. Lindsey
*Attorney, Agent, or Firm*—Mark A. Navarre

[57] ABSTRACT

A locking mechanism for locking a first member that is inserted into a second member into a first member, such as to secure an inductive coupler in a charge port while it is used to charge an electric vehicle. The locking mechanism prevents premature or malicious removal of the coupler before charging has been completed. The locking mechanism has logic that allows a user to set the lock in the charge port prior to insertion of the coupler. The locking mechanism has an actuator coupled to a rotatable link that is rotated thereby. A first pin is coupled to the rotatable link and a hole disposed in the first member that mates with the first pin to lock the inductive coupler in the charge port. A spring loaded release mechanism coupled to the first pin that permits the first pin to slide into the hole. Motion of the cable and the release mechanism releases and locks the first pin in the hole, or retracts the first pin from the hole, thus locking and unlocking the locking mechanism.

5 Claims, 7 Drawing Sheets

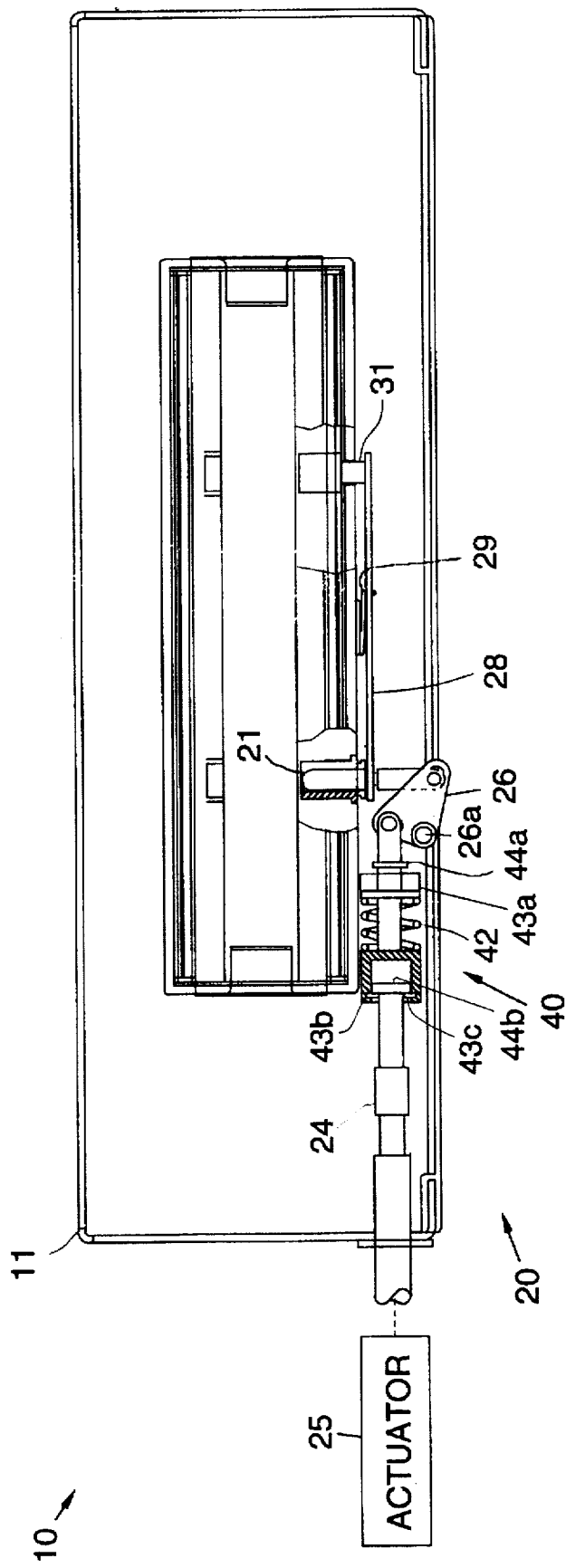

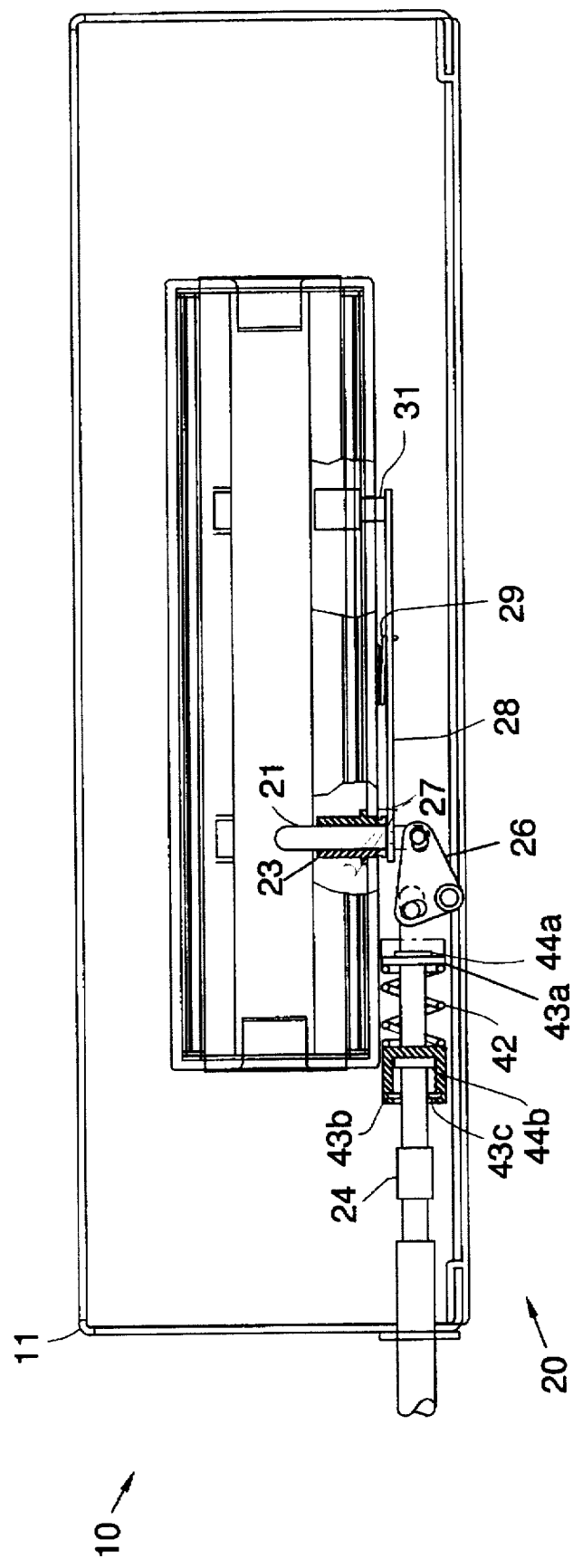

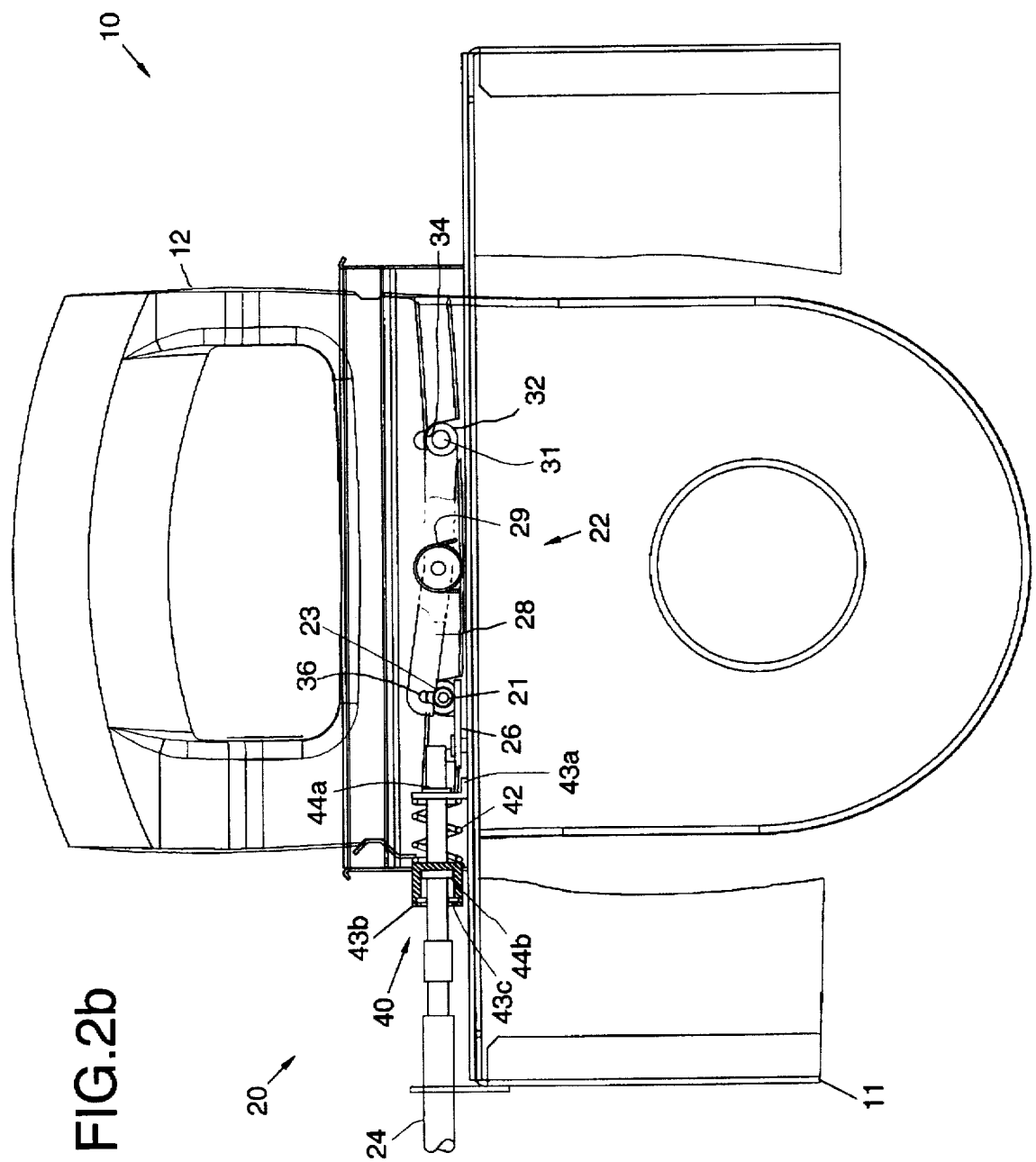

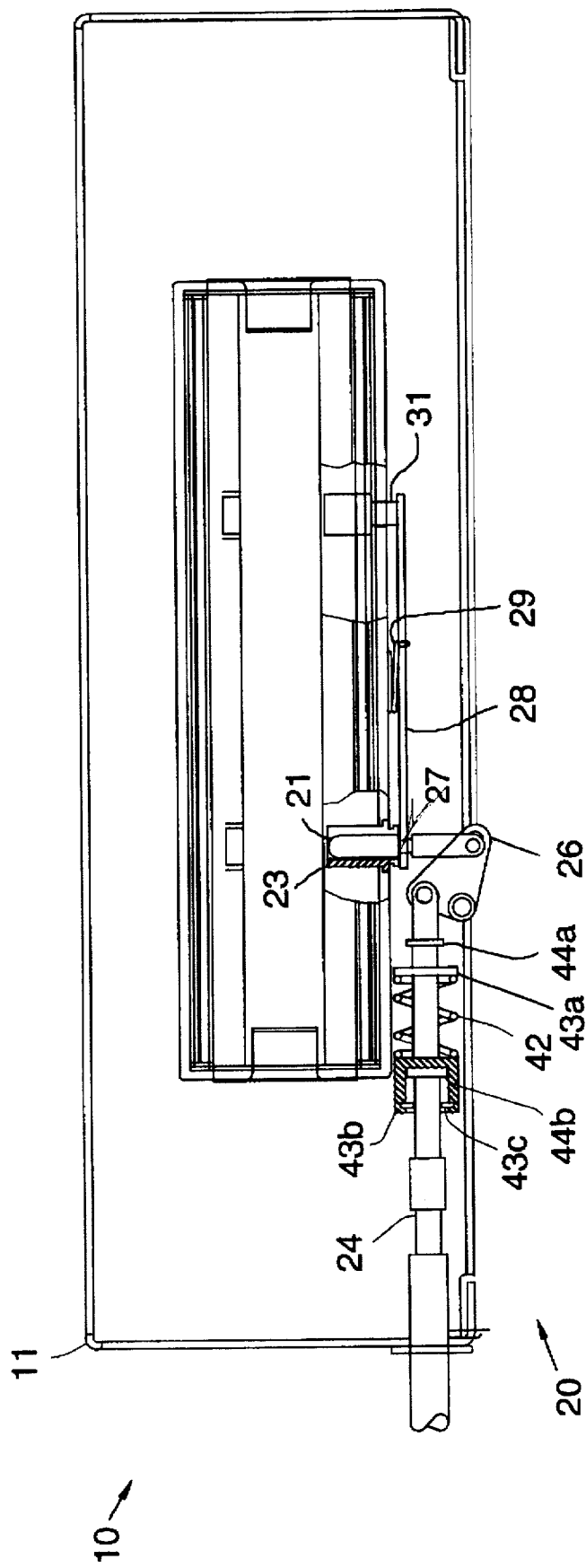

CHARGER LOCKING MECHANISM

BACKGROUND

The present invention relates generally to locking mechanisms, and more particularly, to a locking mechanism for use with an inductive charger.

The assignee of the present invention designs and manufactures inductive charging systems for use in charging electric vehicles. The charging system employs a charge port into which an inductive coupler is inserted to charge the electric vehicle. It has been determined that there is a need for a locking mechanism that secures the inductive coupler in the charge port during the charging process. There is no known prior art for such a locking mechanism.

Although there have not been any previous inductive coupled chargers built with a locking feature, there have been other designs developed by the assignee of the present invention that grabbed the coupler from the side at locations where tactile feel and EMI indents are located. This approach has tolerance problems, and does not solidly lock the coupler in place.

Accordingly, it is an objective of the present invention to provide for a locking mechanism that locks a first member that is inserted into a second member. It is a further objective of the present invention to provide for a locking mechanism that secures an inductive coupler in a charge port of an inductive charger during charging.

SUMMARY OF THE INVENTION

To meet the above and other objectives, the present invention is a locking mechanism for locking a first member that is inserted into a second member. More particularly, the locking mechanism may be used to secure an inductive coupler in a charge port while it is used to charge an electric vehicle. The locking mechanism prevents premature or malicious removal of the coupler before charging has been completed. The locking mechanism has logic that allows a user to set the lock in the charge port prior to insertion of the coupler. This is accomplished with a simple push pull motion of a lock actuator.

More particularly, the locking mechanism comprises a lock actuator that is coupled to a rotatable link by a cable that is used to rotate the rotatable link. A first pin is coupled to the rotatable link, and is caused to slide laterally as a result of motion of he rotatable link. A hole disposed in the first member is designed to mate with the first pin to lock the first member in the second member. A spring loaded release mechanism is coupled to the first pin that locks the pin in an "armed" position and then permits it to slide into the hole when it is disengaged. Motion of the cable and release mechanism thus releases and locks the first pin in the hole, or retracts the first pin from the hole, thus locking and unlocking the locking mechanism.

The lock actuator may be a motor or solenoid, for example. The locking mechanism may comprise a pin delay mechanism that cooperates with a compression spring, a fixed bracket or stop, and two cable stops to insert the first pin in and remove the first pin from the hole. The first pin comprises a groove, and the spring loaded release mechanism may comprise a torsion spring, a lever arm coupled to the torsion spring that has a slot that mates with the groove in the first pin, and a second pin extends from the lever arm and engages a slot a the first member and that pushes the second pin to rotate the lever arm out of the groove in the first pin, thus permitting the first pin to slide into the hole.

The pin delay mechanism thus delays the motion of the first pin into the hole by locking it into a firing position prior to actuation of the release mechanism.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1a shows a top view of a portion of an inductive charging system employing a locking mechanism in accordance with the principles of the present invention;

FIGS. 2a and 2b show top and side views, respectively, of the locking mechanism wherein the coupler is fully inserted into the port; and FIGS. 3a and 3b show top and side views, respectively, of the locking mechanism illustrating cable movement to retract a locking pin.

DETAILED DESCRIPTION

Figure 1B:
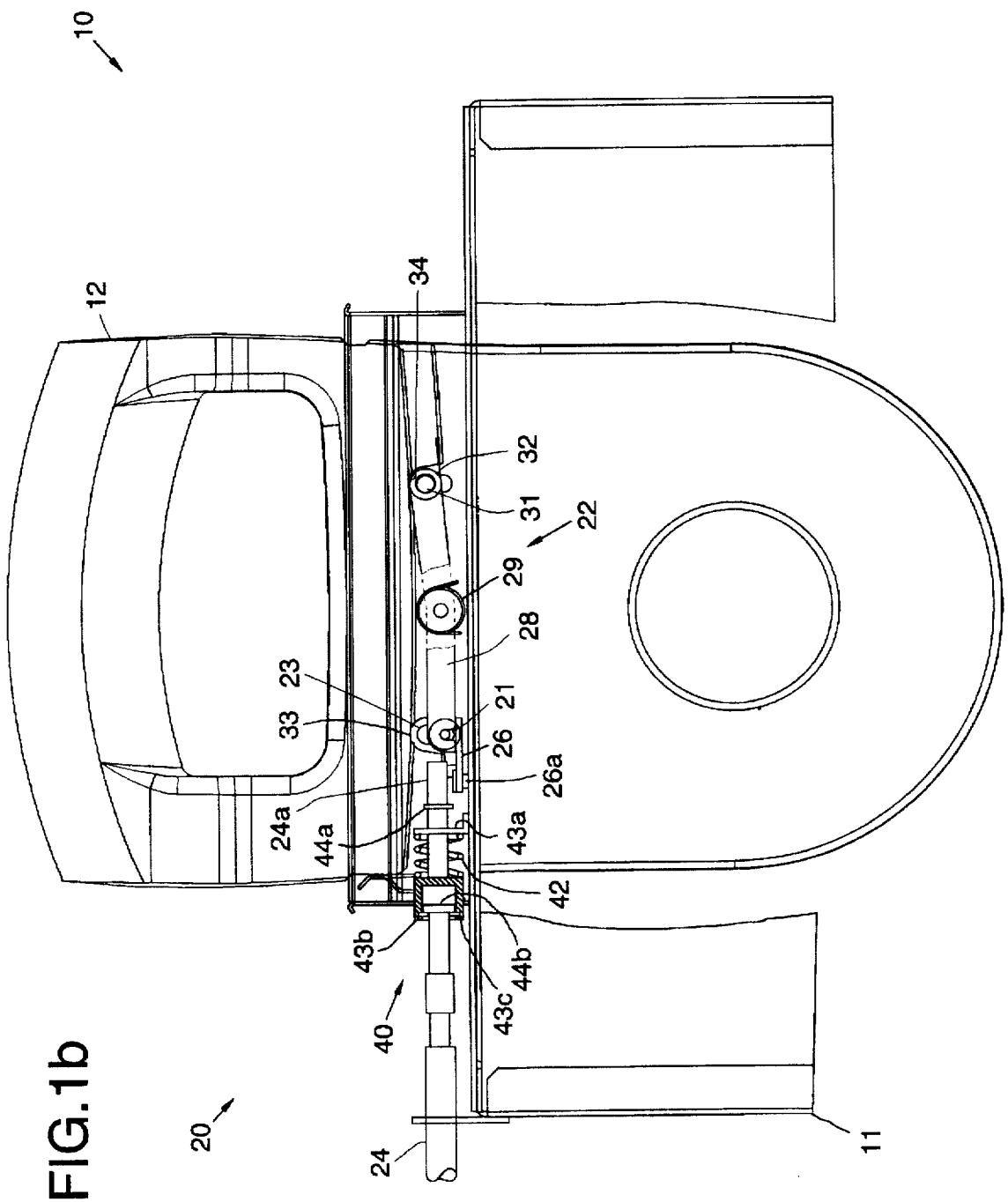
FIG. 1b shows a side view of a portion of the inductive charging system employing the locking mechanism of the present invention wherein the coupler is partially inserted into the port.
Figure 3B:
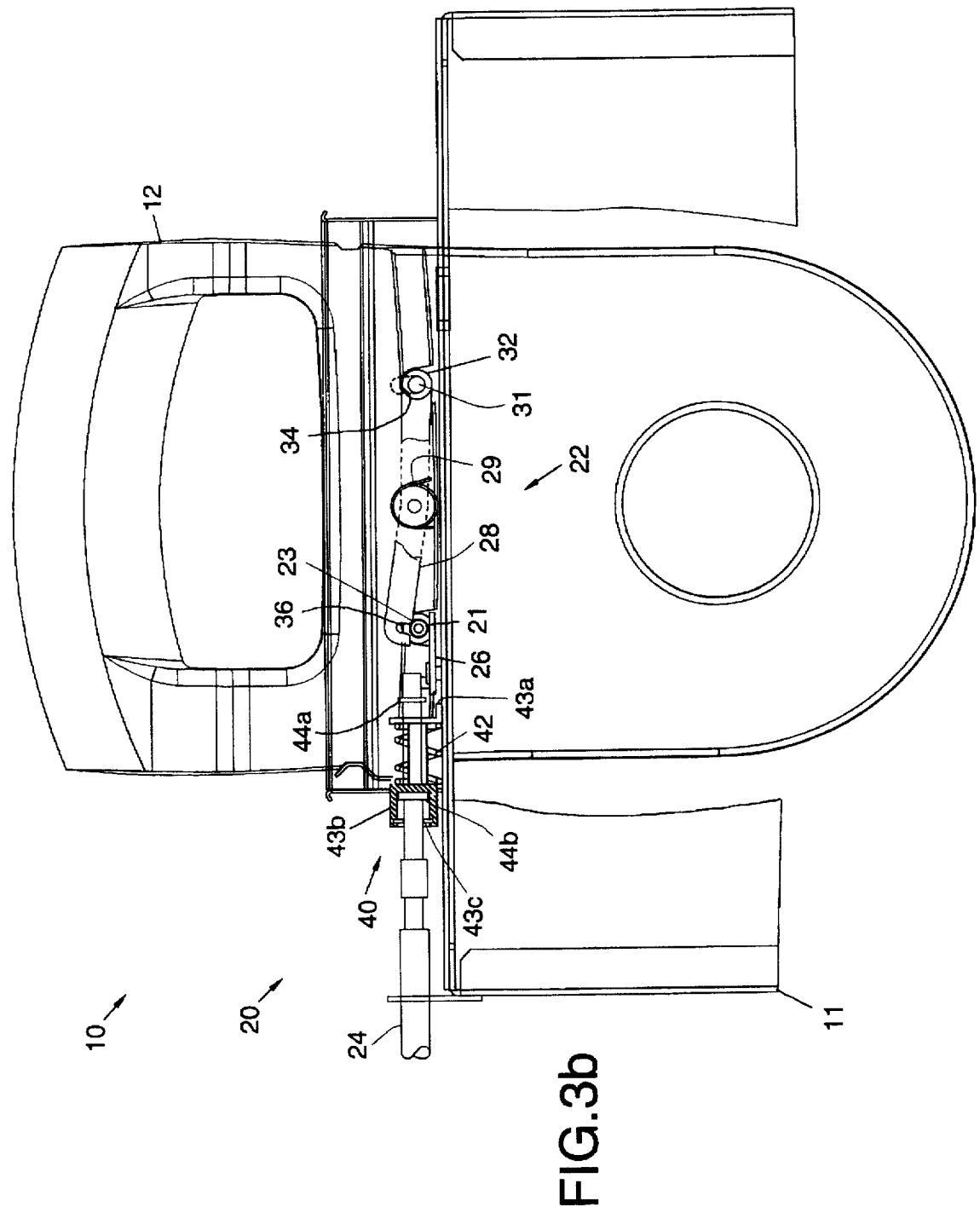

Referring to the drawing figures, FIGS. 1a and 1b show top and side views, respectively, of a portion of an inductive charging system 10 employing a locking mechanism 20 in accordance with the principles of the present invention. In FIG. 1b, the charging coupler 12 is partially inserted into the charge port 11. FIGS. 2a and 2b show views of the locking mechanism 20 wherein the charging coupler 12 is fully inserted into the charge port 11. FIGS. 3a and 3b show views of the locking mechanism 20 illustrating cable movement to unlock it.

Figure 1C:
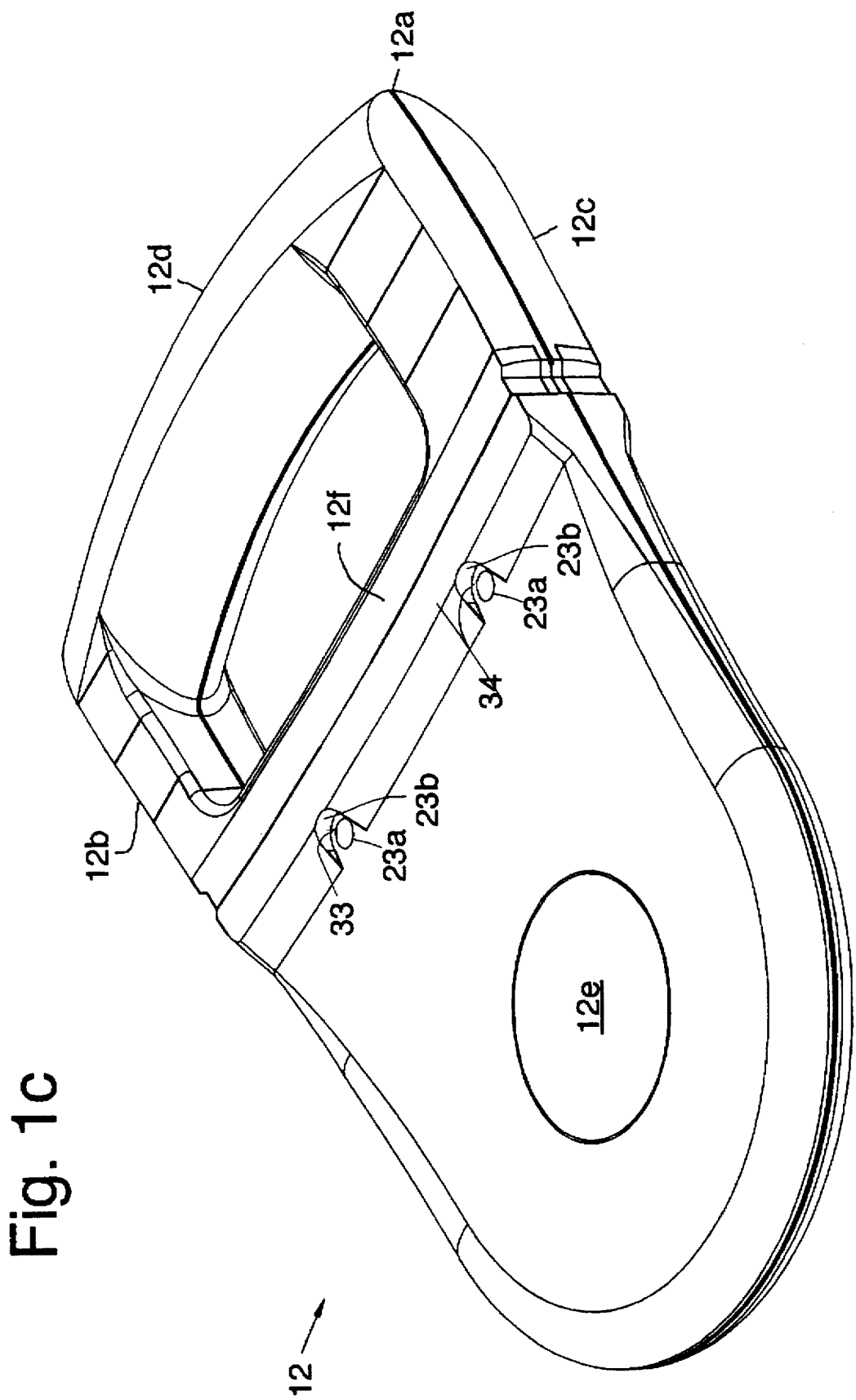
FIG. 1c is a perspective view of the inductive coupler used in the present invention.

The inductive charging system 10 includes a charging coupler 12, coupler paddle 12, or first member 12 (shown in FIGS. 1b and 1c) that is inserted into a charge port 11, or second member 11 (shown in FIG. 1a), to initiate charging of an electric vehicle (not shown). FIG. 1c is a perspective view of the inductive coupler 12 used in the present invention. The charging coupler 12 forms a primary of a transformer while the charge port 11 forms the secondary thereof. Once the charging coupler 12 is inserted into the charge port 11, power is transferred from a power source (not shown) to propulsion batteries of the electric vehicle under control of a controller (not shown).

Referring to FIG. 2, the inductive coupler 12 comprises a plastic housing 12a that has two mating coupler halves 12b, 12c that are configured to provide a handle 12d. The inductive charging coupler 12 has a center ferrite puck 12e and a primary winding (not shown) disposed around the puck 12e. With reference to the present invention, the coupler 12 includes an opening 23a or holes 23a and coupler stops 23b that are employed to lock it into the charge port 11. Conductive plastic strips 12f are disposed along an exterior portion of the coupler 12 that engage metallized electromagnetic interference (EMI) fingers (not shown) on the charge port 11 when the coupler 12 is inserted into the charge port 11.

The locking mechanism 20 has a first pin 21 that cooperates with one of the holes 23a in the coupler paddle 12 (depending upon its orientation during insertion) to lock it in the charge port 11. The first pin 21 is coupled to a rotatable link 26 that rotates about a fixed axis 26a in response to motion of a cable 24 and a spring loaded pin delay mechanism 40. The rotatable link 26 is coupled to one end of the pin delay mechanism 40, which is used to arm the first pin 21 prior to its release into the hole 23a. The rotatable link 26 enables lateral motion of the first pin 21 relative to the motion of the cable 24 and moves the pin 21 into an armed position.

The spring loaded pin delay mechanism 40 comprises a small portion 24a of the cable 24 that is coupled at a first end to the rotatable link 26. The small portion 24a of the cable 24 is inserted through a hole in a fixed bracket 43a, and through the center of a compression spring 42, and is coupled to a cable end flange 43b formed as a cylindrical cup. The small portion 24a of the cable 24 has a first retaining member 44a or retaining clip 44a secured thereto adjacent its first end that prevents it from being pulled through the fixed bracket 43a. One end of a large portion of the cable 24 has an enlarged end or head 44b that forms a second cable stop 44b. The second cable stop 44b is captivated within the cable end flange 43b by a second retaining member 44c or retaining clip 43c that engages an internal groove of the cable end flange 43b. The second cable stop 44b and second retaining clip 43c keeps the cable 24 from pulling out of the cable end flange 43b. An opposite end of the large portion of the cable 24 is connected to a lock actuator 25 (FIG. 1a), which may be provided by a motor or solenoid, for example. The lock actuator 25 is used to pull or push the cable 24 to lock and unlock the locking coupler paddle 12 in the charge port 11.

The spring loaded pin delay mechanism 40 is used to arm the first pin 21 prior to its insertion into the hole 23a in the coupler paddle 12, and to remove the first pin 21 from the hole 23a. Motion of the cable 24 and rotatable link 26 in one direction arms the first pin 21 which is subsequently released and inserted into the hole 23a upon operation of the spring loaded release mechanism 22 thus locking the locking mechanism 20. Motion of the cable 24 and rotatable link 26 in the opposite direction retracts the first pin 21 from the hole 23a, thus unlocking the locking mechanism 20.

The spring loaded release mechanism 22 comprises a lever arm 28 that is spring loaded by a torsion spring 29, and the lever arm 28 has a slot 36 therein (FIG. 2b) that mates with the groove 27 (FIG. 2a) in the first pin 21 when the pin is armed. During arming, the compression spring 42 is compressed against the fixed bracket 43a by motion of the large portion of the cable 24 toward the rotatable link 26. The first pin 21 is moved laterally by this action until the slot 36 in the lever arm 28 mates with the groove 27 in the pin 21. A second pin 31 extends laterally from the lever arm 28 and engages the coupler stop 23b in the coupler paddle 12. When the coupler paddle 12 is fully inserted into the charge port 11, the coupler stop 23b pushes the second pin 31 which rotates the lever arm 28 out of the groove 27 in the first pin 21, thus permitting the first pin 21 to slide into the hole 23a.

The hole 23a in the coupler paddle 12 secures the first pin 21 after the locking mechanism 20 is released. The first pin 21 is inserted in the hole 23a so that the coupler paddle 12 is locked in the charge port 11 with left to fight symmetry. The coupler stop 23b is used to stop the movement of the coupler paddle 12 and is also cooperates with the release mechanism 22 by moving the lever arm 28 out of the groove 27 in the first pin 21, which allows the first pin 21 to slide into the hole 23a. The hole 23a in the coupler paddle 12 are surrounded by overhangs 33, 34 (FIG. 1c) that limit the distance the coupler paddle 12 can be inserted in to the charge port 11. The coupler paddle 12 has left-to-right symmetry and the pin 21 may be inserted into either hole 23a, depending upon the orientation of the coupler paddle 12.

The locking mechanism 20 uses the overhang 34 on the second pin 31 to activate it when the coupler paddle 12 is inserted into the charging port 11. The locking mechanism 20 is first set by pushing against the link 26. This action causes retraction of the first pin 21. The spring loaded lever arm 28 is connected to the torsion spring 29 and falls into the groove 27 in the first pin 21 when the pin 21 is fully retracted. This retains the pin 21 so the coupler paddle 12 can be inserted without any interference.

When the coupler paddle 12 reaches the bottom of the charging port 11, the lever arm 28 is pushed down on one side by the overhang 34 on the second pin 31 and slot 32 in the coupler paddle 12. This action releases the first pin 21 if the rotatable link 26 is allowed to move. This can only be done when the cable 24 or actuator 25 has been pulled (or pushed) to allow motion of the rotatable link 26.

The logic associated with operation a reduced-to-practice embodiment of the locking mechanism 20 is that pushing the cable 24 or actuator 25 unlocks the first pin 21 and sets the locking mechanism 20; pulling the cable 24 or actuator 25 allows the first pin 21 to lock the coupler paddle 12 upon insertion into the charging port 11 and actuation of the release mechanism 22. The logic may be reversed by causing the rotatable link 26 to unlock when it is pulled and lock when it is pushed.

Space constraints originally dictated the design of the preferred embodiment of the locking mechanism 20 in that it was not possible to use an actuator 25 that was located directly in line with the first pin 21, which would eliminate the rotatable link 26.

Thus, a locking mechanism that secures the inductive coupler in the charge port during the charging process has been disclosed. It is to be understood that the above-described embodiment is merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. A locking charger mechanism for an electric vehicle, comprising:

a charger port adapted to be mounted on the vehicle and having a slot formed in an exterior wall thereof;

a charger paddle having a charge coupling portion which is inserted into the slot of said charger port in either of two opposite orientations about a central axis of insertion prior to charging, said charge coupling portion having a pair of openings extending therethrough and a pair of raised stop areas adjacent said openings, and a locking mechanism mounted on said charger port including a cable, a rotatable link coupled to a first end of the cable, an actuator coupled to a second end of the cable for moving the cable to thereby move the rotatable link and a first pin oriented perpendicular to said slot and coupled to the rotatable link for movement into an armed position adjacent said slot in response to rotation of the rotatable link by the actuator; and a spring loaded release mechanism including a second pin oriented perpendicular to said slot and coupled to a lever mechanism adapted to engage the first pin to prevent said first pin from moving into said slot prior to insertion of said charge coupling portion into said slot, said second pin engaging one of said raised stop areas upon insertion of said charge coupling portion to disengage said lever mechanism from said first pin, permitting said first pin to slide into one of said openings to lock said charger paddle in said charger port;

wherein said openings and raised stop areas are positioned symmetrically about said central axis so that said locking and release mechanisms are effective to lock said charger paddle in said charger port in either of said two opposite orientations of said charge coupling portion.

2. The locking charger mechanism of claim 1 wherein the locking mechanism further comprises:

a spring loaded pin delay mechanism comprising a cable end flange that is coupled to an end of the cable, a compression spring disposed between a charger port bracket and the cable end flange, and first and second retaining members coupled to the cable to secure the cable to the pin delay mechanism.

3. The locking charger mechanism of claim 1 wherein the actuator is a solenoid.

4. The locking charger mechanism of claim 1 wherein the actuator is a motor.

5. The locking charger mechanism of claim 1, wherein the first pin includes a groove, and wherein the spring loaded release mechanism comprises a torsion spring, a lever arm coupled to the torsion spring that has a slot therein that engages the groove in the first pin, said second pin extending from the lever arm and engaging one of said raised stop areas upon insertion of said charge coupling portion into said slot, said one raised stop area pushing the second pin to rotate the lever arm out of engagement with the groove in the first pin, thus permitting the first pin to slide into one of said openings.

* * * * *